United States Patent
Hu et al.

(10) Patent No.: US 6,739,586 B2
(45) Date of Patent: May 25, 2004

(54) APPARATUS AND METHOD FOR FORMING WORKPIECES

(75) Inventors: You Xi Hu, Shenzhen (CN); Xi Hua Xu, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 297 days.

(21) Appl. No.: 10/007,507

(22) Filed: Nov. 5, 2001

(65) Prior Publication Data

US 2003/0087587 A1 May 8, 2003

(51) Int. Cl.⁷ .................................................. B25B 11/00
(52) U.S. Cl. ........................ 269/8; 269/289 R; 451/365; 451/380
(58) Field of Search ........................ 269/8, 21, 289 R, 269/901, 909; 451/365, 380, 387

(56) References Cited

U.S. PATENT DOCUMENTS

| | | | | |
|---|---|---|---|---|
| 3,854,711 A | * | 12/1974 | Dong | ............................. 269/8 |
| 4,542,890 A | * | 9/1985 | Braillon | .......................... 269/8 |
| 5,066,936 A | * | 11/1991 | Hsu | ............................. 335/295 |
| 5,971,379 A | * | 10/1999 | Leon, Jr. | ........................ 269/8 |
| 6,039,517 A | * | 3/2000 | Charewicz | ................... 409/135 |
| 6,279,885 B1 | * | 8/2001 | Leon, Jr. | ........................ 269/8 |

* cited by examiner

*Primary Examiner*—Lee D. Wilson
(74) *Attorney, Agent, or Firm*—Wei Te Chung

(57) ABSTRACT

A forming apparatus includes a workbench and a pivot device. The pivot device includes a pivot plate (40) and a fixed plate (60). The pivot plate is fixed below the workbench, and rotatably seated on the fixed plate. The fixed plate defines two cutouts (66) respectively in two corners thereof, to form an arched-shaped top portion (61). Three locking plates (70) are attached on side walls (42, 46) of the pivot plate. When the locking plates are oriented vertically, they can pass over the two corners corresponding to the cutouts but cannot pass over other corners of the fixed plate. When the locking plates are oriented horizontally, they can pass over every corner of the fixed plate. By adjusting orientations of the locking plates, the combined base and pivot plate can be rotated within a variety of predetermined different angles.

7 Claims, 4 Drawing Sheets

APPARATUS AND METHOD FOR FORMING WORKPIECES

BACKGROUND OF THE INVENTION

1. Field of the Invention

The present invention relates to apparatuses and methods for forming workpieces, and particularly to apparatuses and methods that readily and accurately perform a variety of forming operations on metallic workpieces.

2. Related Art

With incessant development of modern manufacturing industries, more and more components having a myriad of different shapes are being required. Shapes commonly found on such components include, for example, inclined surfaces, arcuate surfaces, and steps. A variety of apparatuses and methods are available for forming such components.

Conventional apparatuses and methods for forming workpieces only allow the workpiece to be machined linearly. Arcuate surfaces are often formed using electrodischarge machines. However, electrodischarge machine is complicated and time-consuming. Furthermore, a special electrode is required for every different workpiece. This is unduly costly. Moreover, it is difficult to control the precision with which an electrodischarge machine forms a workpiece. Thus quality control of the workpieces is problematic.

An improved apparatus and method for forming workpieces which overcomes the above-mentioned problems and shortcomings is desired.

SUMMARY OF THE INVENTION

Accordingly, an object of the present invention is to provide an apparatus which can readily and accurately form a surface having three dimensions on a metallic workpiece.

Another object of the present invention is to provide a method which can efficiently and accurately form a surface having three dimensions on a metallic workpiece.

To achieve the above-mentioned objects, a forming apparatus in accordance with the present invention comprises a workbench and a pivot device. The workbench comprises a magnetic base for holding a workpiece thereon. The pivot device comprises a pivot plate and a fixed plate. The pivot plate is fixedly attached below the base, and rotatably seated on the fixed plate. The fixed plate defines a pair of cutouts in two corners thereof respectively, to form an arched-shaped top portion. A pair of locking plates is attached on a first side wall of the pivot plate, and another locking plate is attached on a second side wall of the pivot plate. When the locking plates are oriented vertically, bottom extremities of the locking plates are located between a top extremity of the top portion and a bottom extremity of the top portion. The locking plates can therefore pass over the two corners corresponding to the cutouts, but cannot pass over other corners of the fixed plate. When the locking plates are oriented horizontally, the bottom extremities of the locking plates are higher than the top extremity of the top portion. The locking plates can therefore pass over every corner of the fixed plate. By adjusting orientations of the locking plates, the combined base and pivot plate can be rotated within a variety of predetermined different angles.

Other objects, advantages and novel features of the present invention will be drawn from the following detailed description of preferred embodiments of the present invention with attached drawings, in which:

DESCRIPTION OF THE PREFERRED EMBODIMENT

Figure 1:
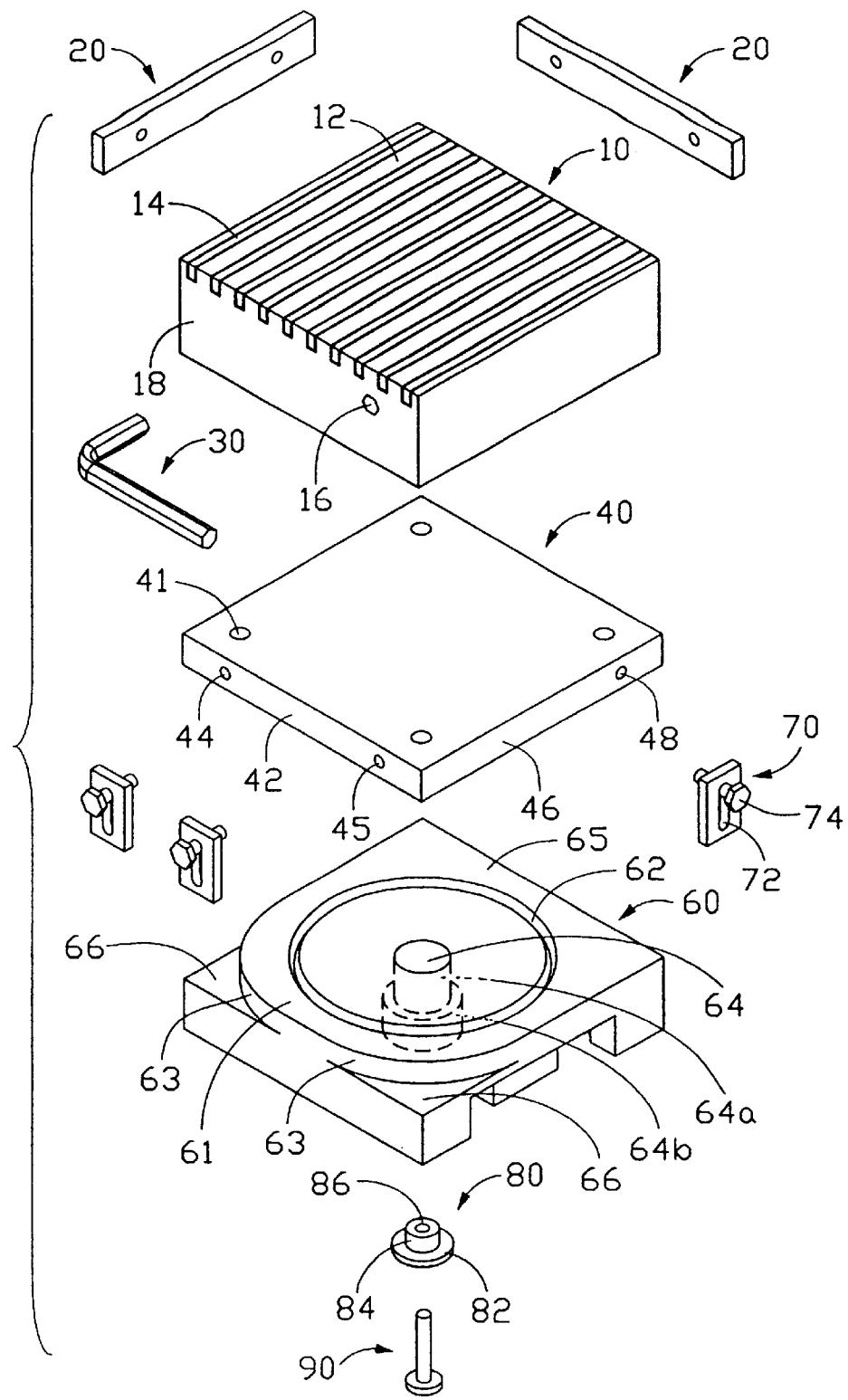
FIG. 1 is an exploded view of a forming apparatus in accordance with the present invention.

Referring to the attached drawings, FIG. 1 shows a forming apparatus in accordance with the present invention. The forming apparatus comprises a workbench and a pivot device.

The workbench comprises a rectangular block-shaped magnetic base 10, a pair of positioning bars 20, and a handle 30. A plurality of parallel grooves (not labeled) is defined in a top plate 12 of the base 10. A plurality of copper strips 14 is interferentially fitted in the grooves of the base 10 respectively. A hole 16 is defined in a side wall 18 of the base 10, for receiving the handle 30. When the handle 30 is in a locked position in the hole 16, the base 10 is magnetized and exerts magnetic force on a workpiece. When the handle 30 is in a released position in the hole 16, the base 10 is demagnetized and has no magnetic force. Four screw holes (not visible) are respectively defined in a vicinity of four corners of a bottom surface of the base 10.

Figure 2A:
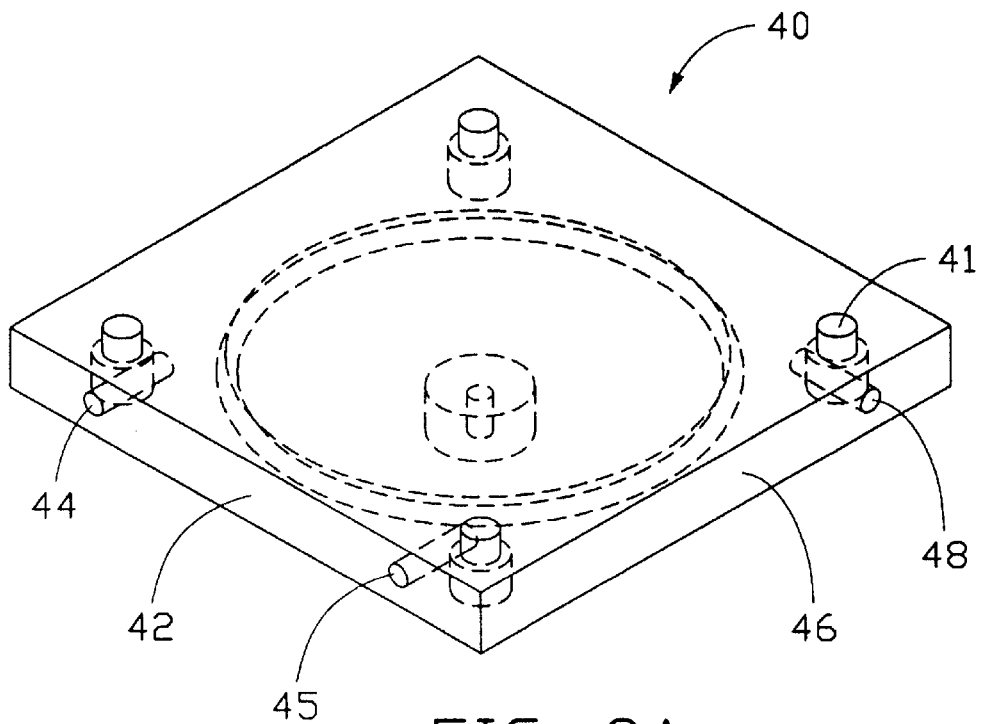
FIG. 2A is a perspective view of a pivot plate of the forming apparatus of FIG. 1.
Figure 2B:
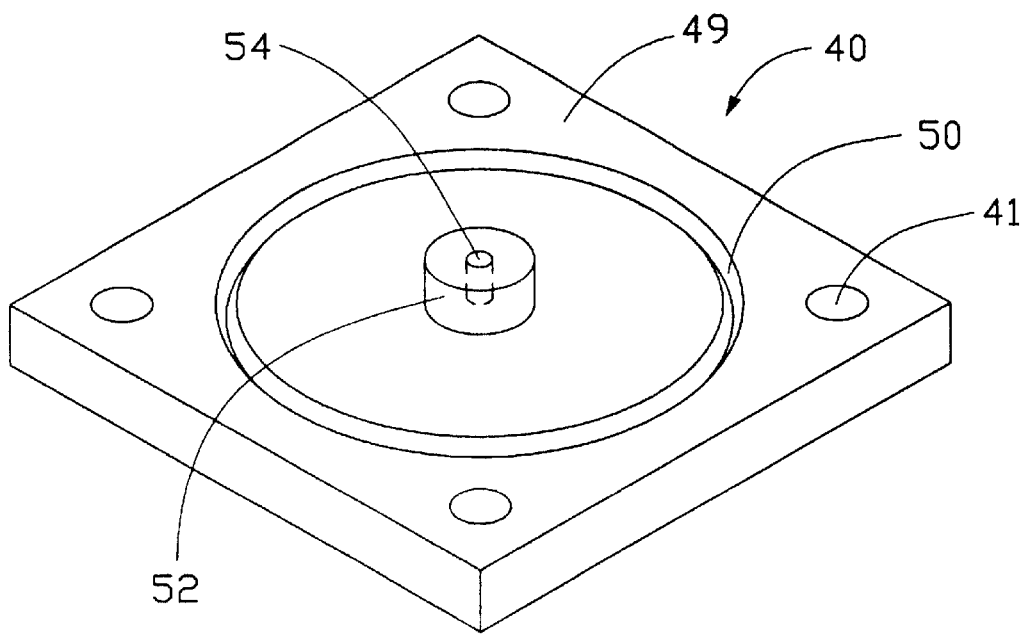
FIG. 2B is similar to FIG. 2A, but viewed from another aspect.

Referring also to FIGS. 2A and 2B, the pivot device comprises a rectangular pivot plate 40, a rectangular fixed plate 60, three locking plates 70, and a sleeve 80. The pivot plate 40 defines four stepped holes 41 in a vicinity of four corners thereof respectively, corresponding to the screw holes of the base 10. A pair of first and second screw apertures 44, 45 is defined in one side wall 42 of the pivot plate 40. A third screw aperture 48 is defined in another side wall 46 of the pivot plate 40 that is perpendicular to the side wall 42. The first, second and third screw apertures 44, 45, 48 correspond to the locking plates 70. A first annular groove 50 is defined in a bottom wall 49 of the pivot plate 40. A cross-section of the first groove 50 is V-shaped. A protrusion 52 depends from a center of the bottom wall 49. A fourth screw aperture 54 is defined in the protrusion 52.

The fixed plate 60 defines a second annular groove 62 in a top wall 65 thereof. A cross-section of the second groove 62 is V-shaped, and the second groove 62 corresponds to the first groove 50. A pair of cutouts 66 is defined in two adjacent corners of the top wall 65 to form an arched-shaped top portion 61. The top portion 61 has a pair of arcuate side surfaces 63, center points of which are concentric with a center point of the top wall 65. A stepped opening 64 is defined through a center of the fixed plate 60. The stepped opening 64 comprises an upper small portion 64a, and a lower large portion 64b in communication with the small portion 64a. The locking plates 70 are similar to each other. Each locking plate 70 defines a slot 72 for extension of a screw 74 therethrough. The sleeve 80 is dimensioned to correspond to dimensions of the stepped opening 64 of the fixed plate 60, and comprises a body 84 and a cap 82. A through opening 86 is defined through the body 84 and the cap 82, for extension of a bolt 90 therethrough.

Figure 3:
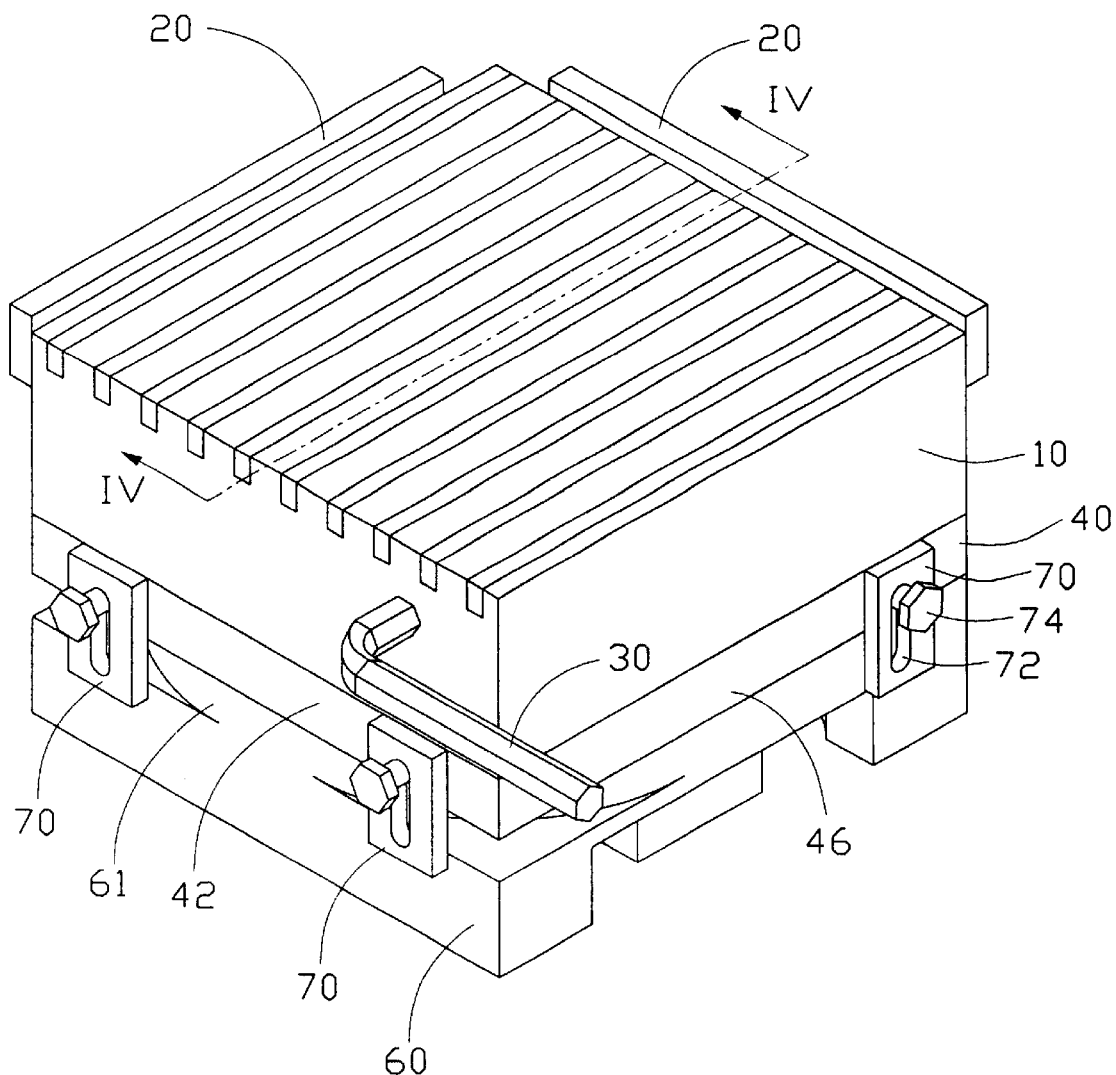
FIG. 3 is an assembled view of FIG. 1.
Figure 4:
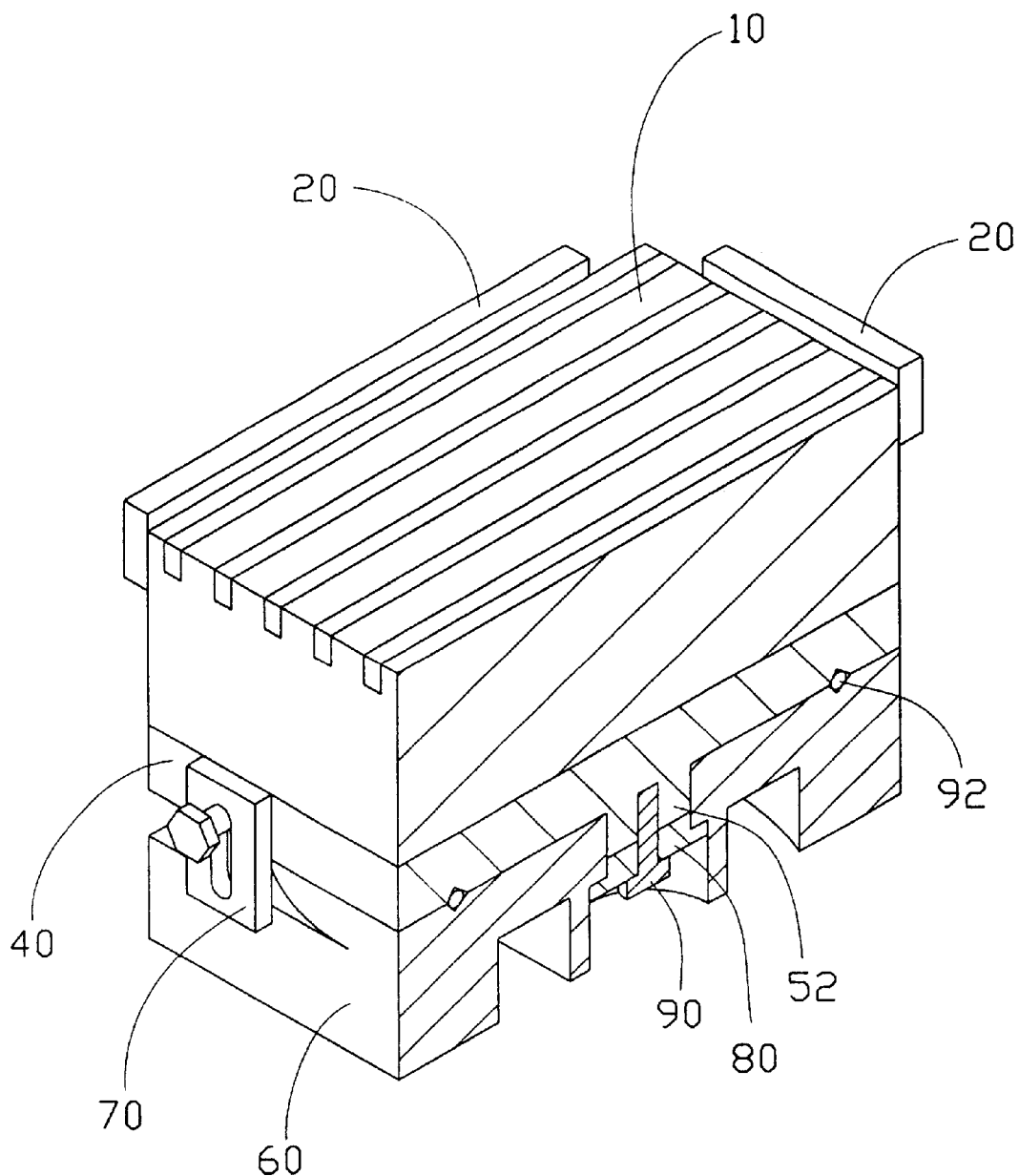
FIG. 4 is a cross-sectional view of FIG. 3, taken along line IV—IV of FIG. 3.

Referring to FIGS. 3 and 4, in assembly, four screws (not shown) are extended through the stepped holes 41 of the pivot plate 40 to engage in the screw holes of the base 10. The pivot plate 40 is thereby secured under the base 10. The positioning bars 20 are respectively attached on two side walls of the base 10 that are perpendicular to each other. Top surfaces of the positioning bars 20 are disposed higher than the top plate 12 of the base 10. A plurality of ball bearings 92 is placed in the second groove 62 of the fixed plate 60. The combined base 10, positioning bars 20 and pivot plate 40 is then placed on the fixed plate 60. The first groove 50 of the pivot plate 40 movably receives the ball bearings 92. The protrusion 52 of the pivot plate 40 is received in the small portion 64a of the stepped opening 64 of the fixed plate 60. The sleeve 80 is inserted into the stepped opening 64 from below the fixed plate 60. The body 84 of the sleeve 80 is received in the small portion 64a of the stepped opening 64, and the cap 82 of the sleeve 80 is received in the large portion 64b of the stepped opening 64. The bolt 90 is then extended through the through opening 86 of the fixed plate 60 to engage in the fourth screw aperture 54 of the pivot plate 40. The pivot plate 40 is thus pivotally attached on the fixed plate 60 so that it is rotatable relative to the fixed plate 60 in horizontal directions. The screws 74 are extended through the slots 72 of the locking plates 70 to engage in the first, second and third screw apertures 44, 45, 48 of the pivot plate 40. The locking plates 70 are thus attached to the pivot plate 40, thereby completing assembly of the forming apparatus.

In the present invention, the ball bearings 92 in the grooves 50, 62 facilitate tight contact between the pivot plate 40 and the fixed plate 60, while also providing reduced friction between the pivot plate 40 and the fixed plate 60 when the pivot plate 40 rotates relative to the fixed plate 60. Orientations of the locking plates 70 are adjustable when the screws 74 are loosened with the first, second and third screw apertures 44, 45, 48. When the locking plates 70 are oriented vertically, bottom extremities of the locking plates 70 are located between a top extremity of the top portion 61 and a bottom extremity of the top portion 61. The locking plates 70 can therefore pass over the two corners of the fixed plate 60 corresponding to the cutouts 66, but cannot pass over other corners of the fixed plate 60. When the locking plates 70 are oriented horizontally, the bottom extremities of the locking plates 70 are located higher than the top extremity of the top portion 61. The locking plates 70 therefore can pass over every corner of the fixed plate 60.

The base 10 can thus be rotated a variety of angles by adjusting orientations of the locking plates 70. When all the locking plates 70 are oriented vertically, the base 10 can be rotated up to 90 degrees in an anti-clockwise direction. When the locking plate 70 attached on the side wall 46 is oriented horizontally and the locking plates 70 attached on the side wall 42 are oriented vertically, the base 10 can be rotated up to 180 degrees. When all the locking plates 70 are oriented horizontally, the base 10 can be rotated 360 degrees.

In operation, a workpiece is magnetically attached on the top plate 12 of the base 10. A center of the workpiece is aligned with a center of the base 10 by using the positioning bars 20 and auxiliary tools (not shown). The locking plates 70 are oriented according to the desired shaping of the workpiece to be performed. A grinding wheel located above the workpiece is rotated to machine the workpiece, and the base 10 is rotated back and forth by pushing the handle 30. The workpiece is thus machined by the grinding wheel until the desired shape has been obtained. When the handle 30 is moved to the released position, the workpiece is easily removed from the base 10.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. An apparatus for forming workpieces, the apparatus comprising:

a workbench comprising a magnetic base adapted for holding a workpiece thereon; and a pivot device comprising a pivot plate, a fixed plate and a plurality of locking plates, the pivot plate fixedly attached below the base and pivotally seated on the fixed plate, the locking plates movably attached on side walls of the pivot plate, wherein the pivot plate can be rotated different angles by adjusting orientations of the locking plates.

2. The apparatus as claimed in claim 1, wherein the fixed plate defines a pair of cutouts respectively in two adjacent corners thereof to form an arched-shaped cop portion, and the locking plates can pass through the cutouts over the two adjacent corners when the pivot plate is rotated relative to the fixed plate.

3. The apparatus as claimed in claim 2, wherein each locking plate is movably attached on a corresponding side wall of the pivot plate by a fastener, and wherein when each locking plate is oriented vertically, a bottom extremity of the locking plate is located between a top extremity of the top portion and a bottom extremity of the top portion, and the locking plate can pass over the two adjacent corners but cannot pass over other corners of the fixed place, and wherein when each locking plate is oriented horizontally, a bottom extremity of the locking plate is located higher than the top extremity of die top portion, and the locking plate can pass over every corner of the fixed plate.

4. The apparatus as claimed in claim 3, wherein the apparatus comprises three locking plates, two of the locking plates are movably attached on a first side wall of the pivot plate, and the other looking plate is movably attached on a second side wall of the pivot plate that is perpendicular to the first side wall.

5. The apparatus as claimed in claim 1, wherein the pivot plate defines a first groove, the fixed plate defines a second groove, and a plurality of ball bearings is movably held in the first and second grooves to reduce pivotal friction between the pivot plate and the fixed plate.

6. The apparatus as claimed in claim 1, wherein the pivot plate forms a protrusion defining a screw aperture therein, the fixed plate defines a stepped opening comprising a small portion receiving the protrusion and a large portion, a sleeve comprising a body and a cap is received in the stepped opening, with the body being received in the small portion and the cap being received in the large portion, and a bolt extends through the sleeve and is engaged with the pivot plate in the screw aperture thereby pivotally attaching the pivot plate on the fixed plate.

7. The apparatus as claimed in claim 1, wherein a handle is movably attached in a side wall of the magnetic base, and when the handle is in a locked position the magnetic base is magnetized and exerts magnetic force, and when the handle is in a released position the base is demagnetized and has no magnetic force.

\* \* \* \* \*